United States Patent
Dais et al.

[11] Patent Number: 5,832,145
[45] Date of Patent: *Nov. 3, 1998

[54] ADHESIVE CLOSURE FOR FLEXIBLE BAG

[75] Inventors: Brian C. Dais, Sanford; Jose Porchia, Midland, both of Mich.

[73] Assignee: Dowbrands L.P., Indianapolis, Ind.

[*] Notice: The term of this patent shall not extend beyond the expiration date of Pat. No. 5,527,112.

[21] Appl. No.: 912,425

[22] Filed: Aug. 18, 1997

Related U.S. Application Data

[63] Continuation of Ser. No. 576,553, Dec. 21, 1995, abandoned, which is a continuation-in-part of Ser. No. 455,267, May 31, 1995, abandoned, which is a continuation of Ser. No. 228,484, Apr. 15, 1994, Pat. No. 5,527,112.

[51] Int. Cl.⁶ .................................................. B65D 33/18
[52] U.S. Cl. .............................. 383/211; 383/35; 383/75
[58] Field of Search .................................. 383/5, 35, 63, 383/65, 93, 95, 210, 211

[56] References Cited

U.S. PATENT DOCUMENTS

| | | |
|---|---|---|
| 2,861,006 | 11/1958 | Salditt . |
| 2,949,370 | 8/1960 | Hughes . |
| 2,991,001 | 7/1961 | Hughes . |
| 3,079,066 | 2/1963 | Roop . |
| 3,085,738 | 4/1963 | Bok . |
| 3,279,331 | 10/1966 | Platt . |
| 3,337,118 | 8/1967 | Friduss . |
| 3,339,606 | 9/1967 | Kugler . |
| 3,592,722 | 7/1971 | Morgan . |
| 3,819,106 | 6/1974 | Schuster . |
| 3,942,713 | 3/1976 | Olson et al. . |
| 3,990,627 | 11/1976 | Olson . |
| 4,285,105 | 8/1981 | Kirkpatrick . |
| 4,392,897 | 7/1983 | Herrington . |
| 4,410,130 | 10/1983 | Herrington . |
| 4,415,087 | 11/1983 | Clayton et al. . |
| 4,419,159 | 12/1983 | Herrington . |

(List continued on next page.)

FOREIGN PATENT DOCUMENTS

| | | |
|---|---|---|
| 1196758 | 11/1985 | Canada . |
| 1204263 | of 1986 | Canada . |
| 1200440 | 2/1986 | Canada . |
| 1213251 | 10/1986 | Canada . |
| 1240296 | 8/1988 | Canada . |
| 089680A3 | 9/1983 | European Pat. Off. . |
| 0264959 | 4/1988 | European Pat. Off. . |
| 389130A1 | 9/1990 | European Pat. Off. . |
| 398731A2 | 11/1990 | European Pat. Off. . |
| 386919 | 4/1965 | Switzerland . |
| 706963 | 4/1954 | United Kingdom . |
| 874683 | 8/1961 | United Kingdom . |
| 1353471 | 5/1974 | United Kingdom . |
| 2058609 | 4/1981 | United Kingdom . |
| 2066208 | 7/1981 | United Kingdom . |
| 9113752 | 3/1991 | WIPO . |

OTHER PUBLICATIONS

English abstract of French Patent No. 2268704 obtained through computer search of Derwent World Patent Index on ORBIT, date Jul. 14, 1994.

English abstract of French Patent No. 2295885 obtained through computer search of Derwent World Patent Index on ORBIT, date Jul. 14, 1994.

English Abstract of Japanese Patent No. 82010153.

English Abstract of Netherlands Patent No. 7409548 no date.

English Abstract of WO (PCT) 8705315 no date.

*Primary Examiner*—Jes F. Pascua

[57] ABSTRACT

A reusable adhesive closure including an adhesive strip affixed transversely across a first inner surface of a front wall of a bag at a preselected distance from the opening of the bag; and a first roughened surface strip positioned transversely across a second inner surface of a rear wall of the bag aligned on the wall opposite from the adhesive strip. The first roughened strip is an integral portion of the wall of the bag. The roughened strip is pressable against and into the adhesive strip, whereby a seal is formed by contacting the adhesive strip with the flexible flap member.

15 Claims, 6 Drawing Sheets

U.S. PATENT DOCUMENTS

| | | |
|---|---|---|
| 4,452,840 | 6/1984 | Sato et al. . |
| 4,479,244 | 10/1984 | Ausnit . |
| 4,519,095 | 5/1985 | Clayton . |
| 4,556,595 | 12/1985 | Ochi . |
| 4,561,109 | 12/1985 | Herrington . |
| 4,587,152 | 5/1986 | Gleichenhagen et al. . |
| 4,603,434 | 7/1986 | Herrington . |
| 4,618,383 | 10/1986 | Herrington . |
| 4,787,754 | 11/1988 | Herrinton . |
| 4,791,710 | 12/1988 | Nocek et al. . |
| 4,817,188 | 3/1989 | Van Erden . |
| 4,863,286 | 9/1989 | Branson . |
| 4,906,310 | 3/1990 | Broderick et al. . |
| 4,923,701 | 5/1990 | Van Erden . |
| 4,947,525 | 8/1990 | Van Erden . |
| 4,959,265 | 9/1990 | Wood et al. . |
| 5,009,828 | 4/1991 | McCree . |
| 5,017,021 | 5/1991 | Simonsen et al. . |
| 5,113,555 | 5/1992 | Wilson et al. . |
| 5,167,454 | 12/1992 | Woods et al. . |
| 5,192,135 | 3/1993 | Woods et al. . |
| 5,248,201 | 9/1993 | Kettner et al. . |
| 5,474,382 | 12/1995 | May ................................ 383/63 X |
| 5,527,112 | 6/1996 | Dais et al. ........................ 383/63 X |

ADHESIVE CLOSURE FOR FLEXIBLE BAG

CROSS REFERENCE TO RELATED APPLICATION.

This is a continuation of application Ser. No. 08/576,553 filed Dec. 21, 1995 now abandoned, which is a Continuation-in-Part of application Ser. No. 08/455,267, filed May 31, 1995 now abandoned which is a Continuation of application Ser. No. 08/228,484, filed Apr. 15, 1994, now U.S. Pat. No. 5,527,112.

BACKGROUND OF THE INVENTION

This invention relates to a closure for a thermoplastic bag and more specifically, this invention relates to an adhesive closure arrangement for a flexible thermoplastic bag.

Adhesive type closure arrangements have been used to seal and/or close plastic bags such as those used for sandwiches, garbage containers, and other household uses. For example, U.S. Pat. No. 4,519,095 describes an adhesive channel closure suitable for use with flexible bags, such as thermoplastic bags, especially those made from polyethylene, wherein the closure comprises at least one female channel member or strip affixed to the bag and having a pressure sensitive adhesive layer on an internal portion of the channel strip such that the thickness of the adhesive layer is less than the interior depth of the walls of the channel strip. During shipment and storage the walls of the channel hold the pressure sensitive adhesive layer away from adjacent surfaces to prevent inadvertent sticking. Sealing of the bag is achieved by contacting the channel strip with a surface of the bag and exerting pressure along the strip whereby the pressure sensitive adhesive is contacted with a substantially flat portion of the surface and adhered thereto.

U.S. Pat. No. 4,519,095 shows a channel with the adhesive layer positioned on a flap of the bag; a channel with the adhesive positioned on the body of the bag over which the flap will fold; and two female channel strips positioned on opposite sides of a bag opening to affect a double seal by pressing the two channels into contact such that one wall or bead of each channel is contacted by the adhesive layer in the opposing channel.

One problem with the adhesive closures having rigid channel strip ribs described in U.S. Pat. No. 4,519,095 is that the closures are not easy to close. A sufficient amount of pressure applied to the rigid channel strip ribs is required to overcome the rigidity of the ribs to effectuate a closure. In addition, the closure requires restricting the width between the ribs to a predetermined width in order to avoid premature contact of the pressure sensitive adhesive with the opposite contact surface wall during processing and shipping of the bag, i.e., to avoid premature closure. The channels are also too narrow to accommodate the thumb of a user. Also, there is less surface contact between wall and adhesive because of the height and width of the channel. In addition, the bag surface adjacent the adhesive wrinkles easy causing an inadequate closure and leakage of liquids through the closure. Furthermore, there is no tactility indication on the closure described in U.S. Pat. No. 4,519,095. Also, there is no indication to a user of whether the bag is closed or open.

It is desired to avoid the problems with the prior art closures and provide closures suitable for use with plastic bags wherein the closures are able to effect a satisfactory seal as needed.

It is also desired to provide a flexible bag with an easy openable and resealable closure. And, contrary to U.S. Pat. No. 4,519,095, it is desired to have contact of the adhesive and opposite surface during processing and prior to shipping.

SUMMARY OF THE INVENTION

One aspect of the present invention is directed to an adhesive closure useful for a flexible thermoplastic bag including:

an adhesive strip affixed transversely across the longitudinal width of a first inner surface of one of a front wall or rear wall of the bag at a preselected distance from the opening of the bag; and a first roughened surface strip affixed transversely across the longitudinal width of a second inner surface of one of a front wall or rear wall of the bag, and aligned on the wall opposite from the adhesive strip on the first inner surface, at a preselected distance from the opening of the bag;

said roughened surface of said bag being pressable against and into said adhesive strip on said first inner surface, whereby a seal is formed by contacting said adhesive strip with said roughened surface of said second inner surface.

Another aspect of the present invention is directed to a resealable flexible thermoplastic bag including a front wall and a back wall, said walls being joined along the major portions of their opposite longitudinal edges and bottom; an open mouth adjacent to the top edge of said bag; and the aforementioned adhesive closure near the open mouth of said bag.

In one embodiment of the closure of the present invention, a female channel strip is affixed to a surface of one of said front wall or said back wall at a preselected distance from said opening; and a roughened surface is affixed to the other of said front wall or said back wall opposite the female channel; said channel strip having a trough between two channel ribs; and an adhesive layer in said trough, such that the roughened surface is pressable into said trough between said channel ribs, whereby a seal is formed by contacting said adhesive layer with said roughened surface.

In another embodiment of the closure of the present invention, a self-alignment guidance rib member is positioned adjacent the roughened surface on the opposite wall from the channel strip and which contacts one of the channel rib members.

In still another embodiment, a tactility surface is provided on the outer surface of the wall that the roughened surface is attached.

DETAILED DESCRIPTION OF THE PREFERRED EMBODIMENTS

Figure 1:
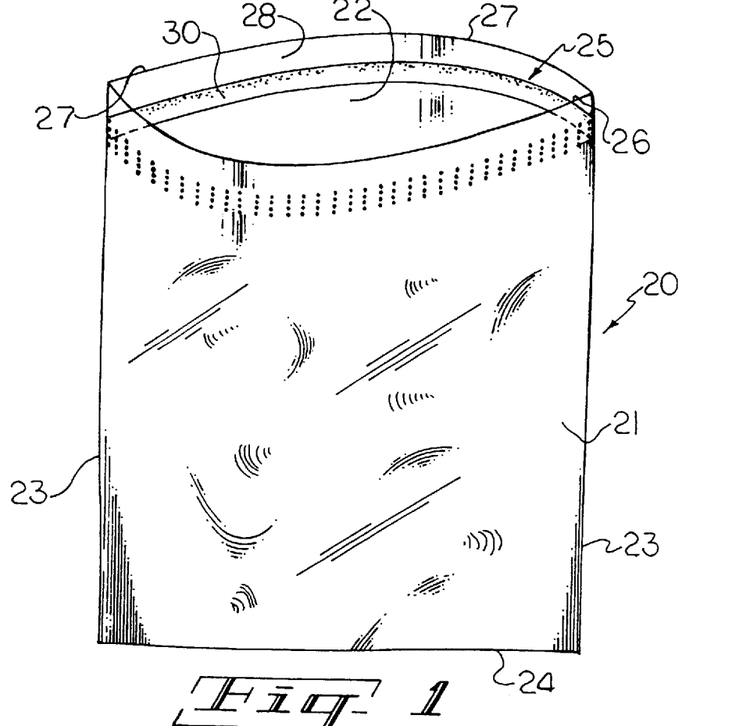
FIG. 1 is an elevational view of a thermoplastic bag having one embodiment of a closure constructed in accordance with the present invention.

FIG. 1 shows a thermoplastic bag having a closure constructed in accordance with the present invention. A bag or bag body 20 comprises a front wall 21 overlying a back wall 22. Front wall 21 is attached to back wall 22 along opposite longitudinal heat seal edges 23 and bottom fold line 24, thereby forming an open mouth adjacent to the top edge of the bag. The open mouth provides access to the interior of the bag. The bag is preferably made out of a plastic film such as polyethylene. Adjacent the top edge opening of the bag 20 is positioned a closure arrangement generally indicated as numeral 25, the various embodiments shown in more detail in FIGS. 2 to 10.

Figure 2:
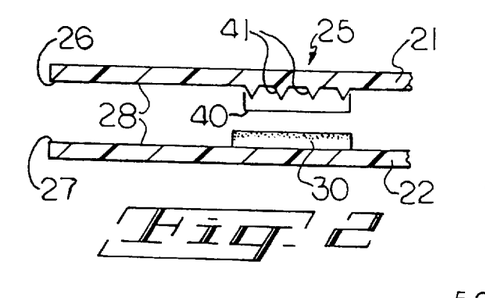
FIG. 2 is an enlarged cross-sectional view of one embodiment of the closure of the present invention.

With reference to FIG. 2, and in its broadest scope, the closure arrangement 25 is made up of an adhesive member 30 mounted on and positioned on the inside surface of one wall, for example the back wall 22, and a roughened surface member 40 mounted on and positioned on the inside surface of one wall, for example the front wall 21 which is aligned with and opposite of the adhesive strip 30. The adhesive member and roughened surface member are provided in the form of strips that extend transversely across the full longitudinal width of the opening and are mounted to the bag generally near respectively longitudinal edges 26 and 27 closest to the opening of the bag. A surface 28 between the upper edges 26 and 27 and closure members on walls 21 and 22 is provided for gripping by a user.

Closure of the bag 20 is effected by contacting the front wall 21 to the back wall 22 and applying pressure along the area where adhesive strip 30 is contacted with the front wall member 21 thereby contacting the adhesive 30 with the roughened strip 40 of front member 21. Thus, the adhesive strip and roughened surface mesh together and join the front wall 21 to the back wall 22 of the bag to enclose the opening of the bag. It is one of the features of the present invention that the bag may be easily closed by contacting at least a portion of the roughened surface across the width of the bag without the closure strips being precisely aligned. During use, the adhesive and roughened surface are pressed together and secured together to join the front wall 21 to the back wall 22 and enclose the opening. When desired to open the bag, the front wall and the back wall may be grasped at the gripping surface 28 and pulled apart. The closure may be pressed and pulled apart many times to easily open (and reopen) and close the bag opening.

The adhesive 30 of the present invention may be made of, for example, pressure-sensitive adhesive material or contact adhesive material. Preferably, the closures of the present invention are useful with adhesive systems such as pressure-sensitive adhesive materials including acrylic, natural and synthetic rubber types. Adhesives having good peel strength are also preferred.

The inside surface roughened portion 40 of the front wall 21 in contact with adhesive 30 is preferably roughened to advantageously provide a means for substantially preventing wrinkling of the contact surface upon closing of the bag. The roughened surface 40 also provides more surface area for adhesive contact and, thus, greater adhesion. The roughened surface 40 can be any type of surface to provide a wrinkle-free closure, for example, a uniform outwardly facing structured surface such as vertical or horizontal ridges or an embossing pattern.

Figure 15:
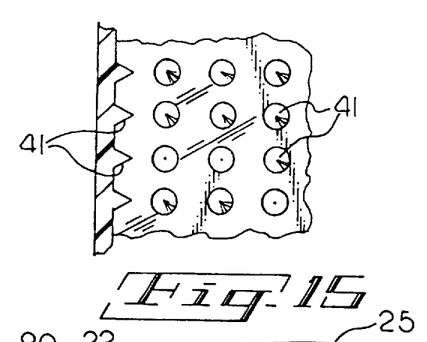
Figure 16:
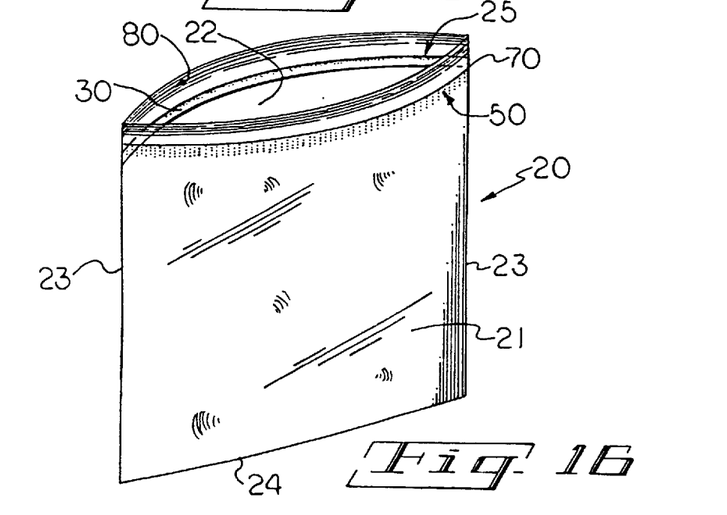
FIG. 16 is an elevational view of a thermoplastic bag having another embodiment of a closure constructed in accordance with the present invention.

In FIGS. 11 to 15 there is shown various embodiments of a plurality of protuberances 41 of various shapes which can be used as the roughened surface 40. For example, the protuberances 41 used in the present invention may be triangular in shape (FIG. 11), spherical in shape (FIG. 12), honey-combed in shape (FIG. 13), pyramidal in shape (FIG. 14), or conical in shape (FIG. 15). Other protuberances useful in the present invention and their manufacture are described in U.S. Pat. No. 5,113,555 incorporated herein by reference.

Generally, the roughened surface 40 may be extruded or embossed. More particularly, the roughened surface may be extruded as an integral portion of the bag itself, or embossed directly on the surfaces of the bag, rather than constructed as a separate member that is mounted on the bag.

Figure 20:
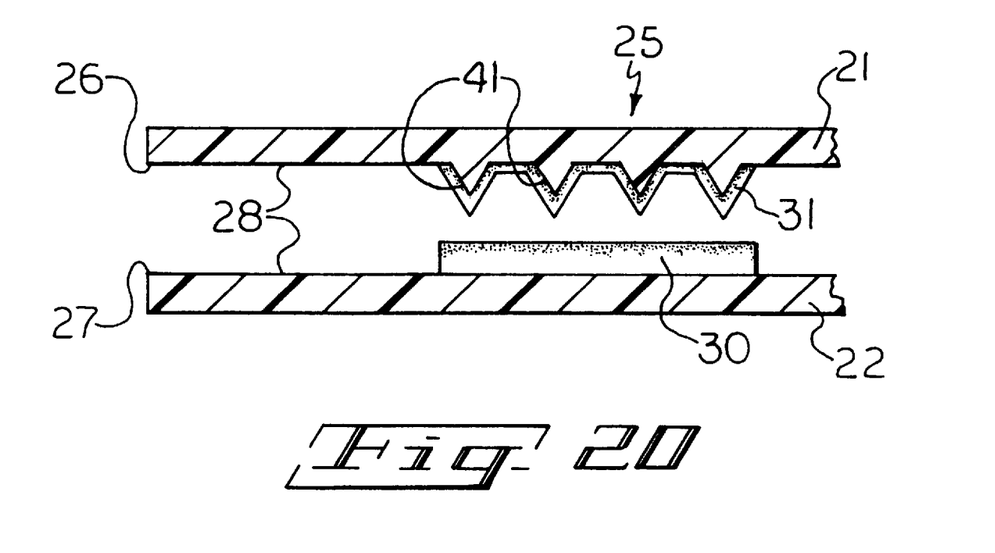
FIG. 20 is an enlarged cross-sectional view of one embodiment of the closure of the present invention.

In an optional embodiment shown in FIG. 20, the roughened surface area 40 may contain a layer or coating of another adhesive 31 such as an adhesive of the same material or of different material than the adhesive 30 for contact adhesion provided that the other second adhesive 31 adheres only to the adhesive 30. The second adhesive 31 would readily attach to and detach from the adhesive 30 to provide the resealable feature of the present invention.

Figure 3:
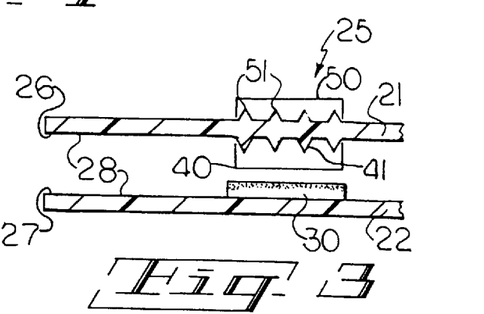
FIGS. 3 to 10 are enlarged cross-sectional views of various embodiments of the closure of the present invention.

With reference to FIG. 3, there is shown another embodiment of the closure of the present invention including a second roughened surface 50 located on the outer surface opposite the first roughened surface 40. The outer contact surface 50 is used as a contact surface for contacting with a thumb or finger to provide tactility to a user.

The outside roughened surface portion 50 to be contacted with a thumb or finger of a user upon closing the bag is also preferably roughened to advantageously provide a means for tactility when closing the bag. The roughened surface 50 can be any type of surface to provide tactility, for example, vertical or horizontal ridges or an embossing pattern with protuberances 51. The roughened surface 50 can be of the same type of surface as described with reference to roughened surface 40 for example, the embossing patterns with protuberances 41 shown in FIGS. 11 to 15. Examples of other types of outer roughened surfaces for the closure members which can be used in the present invention are described in U.S. Pat. No. 4,479,244, which is incorporated herein by reference.

Figure 17:
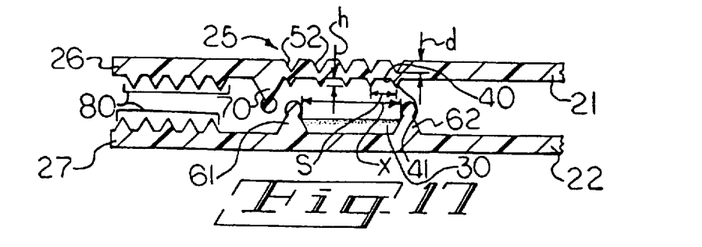
FIG. 17 is an enlarged cross-sectional view of another embodiment of the closure of the present invention.

In a preferred embodiment, the inner and outer roughened surfaces, 40 and 50, respectively, are created substantially simultaneously in one step by impressing or embossing the outside surface of wall 21 with sufficient pressure pressing against the film thickness, for example using a pressure roller having conical protuberances to create a plurality of protuberances 41 on the inside surface 30 and a series of indentions or recesses 52 on the outside surface 50 as shown in FIG. 17.

Generally, the depth "d"" of the recess is up to about the thickness of the film and the height "h" of the protuberance is from a ratio of "h/d" of about 1.1 to about 1.9. The spacing "s" between protuberances is from about 1/64 inch to about 1/4 inch. A sufficient surface portion of the front wall 21 is embossed to cover substantially the entire distance "x" of the adhesive strip 30. The embossing pattern can be formed by any conventional roller means having protuberances of the desired shape.

Figure 4:
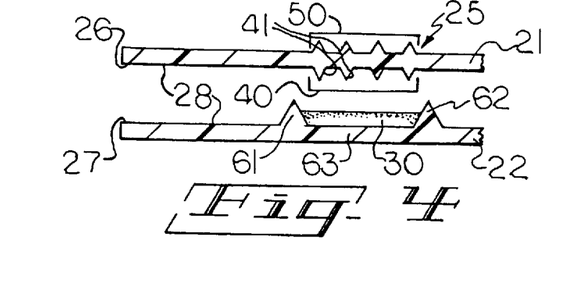

With reference to FIG. 4, there is shown a more preferred embodiment of closure 25 of the present invention including a female channel strip 60 positioned on the inside surface of one wall, for example the back wall 22, at a preselected distance from the opening. The adhesive 30 is affixed to and positioned inside the channel strip 60.

The channel strip 60 has walls or ribs 61 and 62 and a base 63 which comprise a trough. Rib 61 will herein be referred to as upper rib 61 because it is nearest the top edge opening of the bag 20 and rib 62 will herein be referred to as lower rib 62 because it is below rib 61 relative to the top edge opening of the bag, when the bag is in an upright position as shown in FIG. 1. Preferably, base 63 is a layer formed integrally with ribs 61 and 62. Channel 60 may be fabricated in a separate step and applied to the wall 22 or it may be formed as an integral part of wall 22, e.g., by a heat deformation process such as well known post-applied extrusion or lamination processes. Interior to channel 60 is a layer of pressure sensitive adhesive 30, uniformly layered between the ribs 61 or 62 of channel 60 and which should preferably be applied to the bottom or base portion 63 of channel 60. Preferably, the adhesive layer 30 is a continuous or uninterrupted layer. The adhesive 30 may be applied as a hot melt, coating or any of a number of conventional adhesive application methods.

Closure of the bag 20 is effected by contacting the front wall 21 to the back wall 22 and applying pressure along the area where channel strip 60 is contacted with front wall member 21 thereby contacting the adhesive 30 with the roughened sectional strip 40 of front wall member 21.

Figure 5:
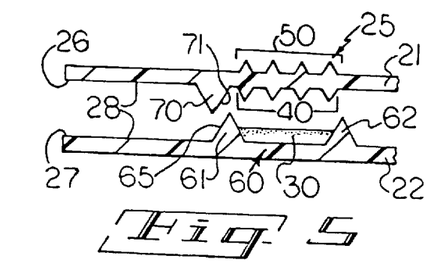
Figure 6:
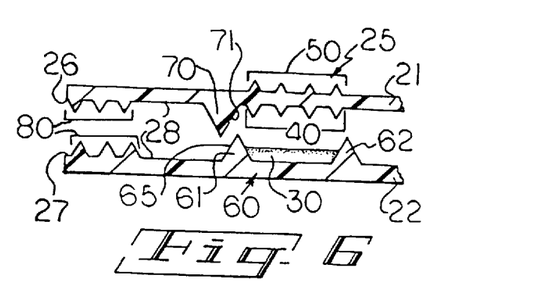
Figure 7:
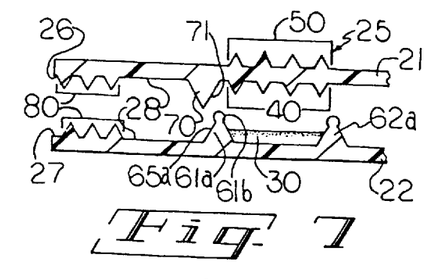
Figure 8:
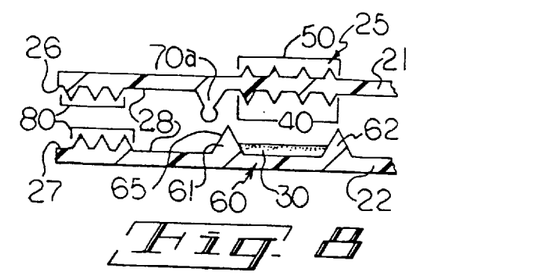
Figure 9:
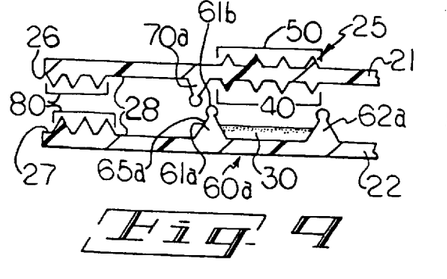
Figure 10:
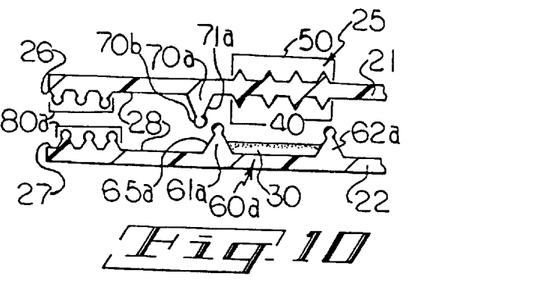
Figure 11:
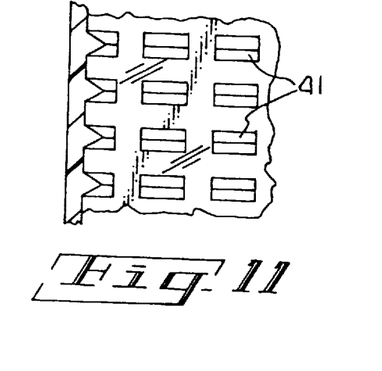
FIGS. 11 to 15 are partly cross-sectional and partly front view of various embodiments of the roughened surface portion of the closure of the present invention.
Figure 12:
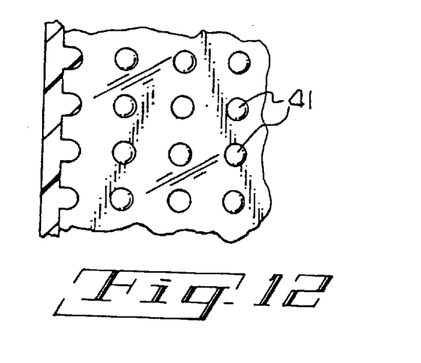
Figure 13:
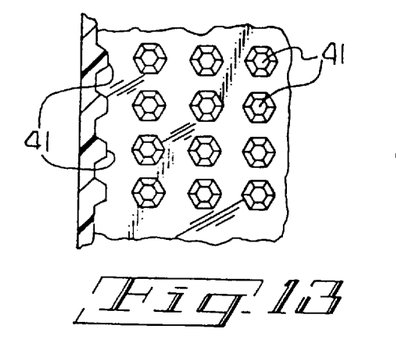
Figure 14:
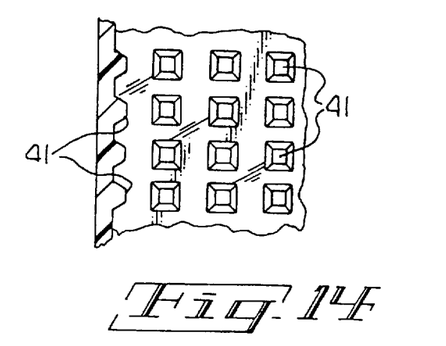

With reference to FIG. 5, there is shown an even more preferred embodiment including a guidance rib member 70 located adjacent the inner contact surface 40 for contacting the channel strip 60.

The front wall 21 of the bag 10 preferably contains a self-aligning and guidance means for the closure 25, in this instance, an aligning rib member 70. The rib 70 is on the inside surface of front wall 21 opposite the rib member 61 and off set slightly from rib 61, just above the upper rib 61, to provide a mating surface 71 with the surface 65 of rib 61. The guidance rib 70 provides a tactile guide for the thumb or finger of a user as the thumb or finger travels on the surface 50 and the front wall 21 is pressed against the back wall 22 for closure. The guidance rib 70 also provides a guide to align the contact surface 40 of the front wall 21 for contacting with the channel 60.

In an optional embodiment the front and/or rear walls 21 and 22, respectively, at near the upper edges 26 and 27, respectively on the gripping surface 28 can contain "grip strips" or gripping surfaces made up of ribs 80 as described in U.S. Pat. Nos. 5,009,828 and 5,167,454 incorporated herein by reference. In the alternative, the gripping surface 80 may be a roughened surface or embossed surface as described in European Patent No. 0 089 680, incorporated herein by reference.

FIGS. 7 to 10 show an enlarged cross-section views of another embodiments of closure 25 constructed in accordance with this invention in which the rib members 61a and 62a, the alignment rib member 70a, and/or the grip strips 80a have a key-hole type shape as described in U.S. Pat. Nos. 5,167,454 and 5,192,135, incorporated herein by reference. In the alternate embodiments shown in FIGS. 7–10, the guidance rib 70a with bulbous head 70b advantageously slides off the bulbous head 61b of rib 61a for ease of closure.

Any of the rib members 61 and 62 or guidance member 70 may be formed by extruding two extruded beads or ribs 61 and 62 onto a film web member to form a channel strip 60. The channel strip 60 of such an embodiment would have a base 63 comprising a portion of the film surface between the two beads 61 and 62, and a layer of adhesive 30 would be positioned on the surface within the area defined by the beads 61 and 62.

In FIGS. 16 to 19, there is shown a most preferred embodiment of the present invention wherein the guidance rib member 70 and the rib members 61 and 62 of the closure 25 includes a bulbous portion as shown in FIG. 17.

Figure 18:
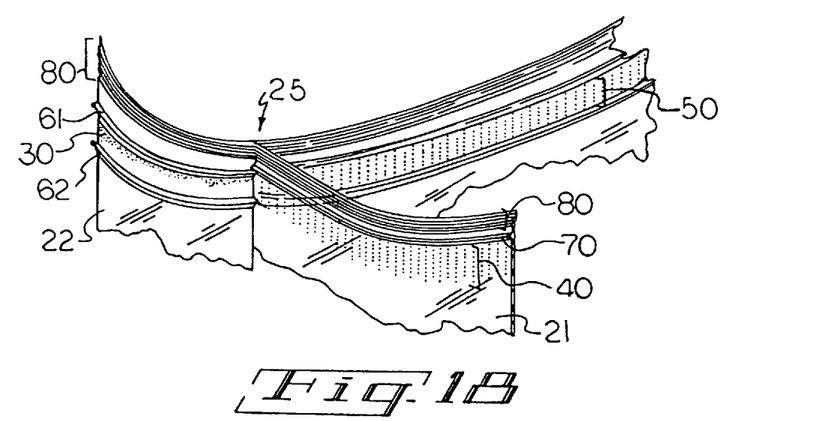
FIG. 18 is a portion of the bag of FIG. 16 showing the closure portion partly opened and partly closed.

As shown in FIG. 18, as the bag is closed by pressing the front wall 21 against the back wall 22 at the channel 60 and embossed surface area 50, the guidance rib 70 rides on rib 61 while the roughened contact surface 40 is contacted with adhesive 30.

Figure 19:
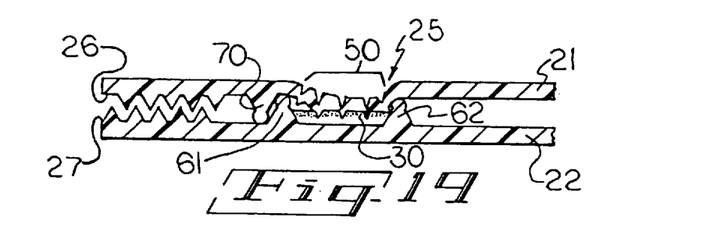
FIG. 19 is an enlarged cross-sectional view of the closure shown in FIG. 17 in a closed position.

FIG. 19 shows a sectional view of an enlarged cross-section of the closure 25 of the present invention in a sealed position in which female channel strip 60 with adhesive layer 30 on an internal portion of the channel strip 60 in the trough, is positioned against the second surface 40 contacted with the adhesive layer 30 contained in channel strip 60 and has been pressed into the trough of the channel and into intimate contact with the adhesive layer, thus effecting sealing of the closure 25. The portion of surface 40 of the front wall 21 that is contacted with adhesive layer 30 is deformed as may be seen in FIG. 19 to provide a seal.

The amount of adhesive 30 contained in the channel structure 60 between the ribs 61 and 62 of channel structure 60 may be varied as desired. Generally, the amount of adhesive used or the thickness of adhesive layer is up to a height sufficient to provide a uniform deformable surface to accommodate the height of the protuberances and to maintain contact with the surface area of the film wall at the base of the protuberances and the area between the protuberances to obtain the desired adhesion. The layer of adhesive 30 may be coated into channel structure 60 either as a continuous layer or as an interrupted layer, but is preferably applied at the bottom or base 63 as a continuous layer.

The dimension of ribs 61 and 62, including height and width, are selected such that each rib can be up to about 50 times thicker than the thickness of the film. The spacing between the ribs is selected to fit an average size thumb comfortably. A variety of dimensions may be used for the exterior height "r" and thickness "t" of channel ribs 61 and 62, interior width "w" of channel structure 60, and thickness "a" of adhesive layer 30. In a particularly preferred embodiment an extruded strip comprising polyethylene is applied to a polyethylene bag surface by means of a hot melt technique. A ribbon of pressure sensitive adhesive is positioned between the walls or ribs of the strip. The channel or ribbon structure is constructed so that the height "r" of the ribs 61 and 62 of the channel is from about 30 mils to about 70 mils high and the distance "w" between channel ribs 61 and 62 is from about ⅜ inch to about ⅝ inch apart. The thickness "t" of each channel ribs 61 and 62 is constructed to be from about 10 mils to about 30 mils, the thickness "a" of pressure sensitive adhesive layer 30 is a coating about 2 mils or less; or a height to provide a uniform deformable surface, and the layer of polyethylene is from about 0.5 mil to about 4 mils thick.

Pluralities of the closures of the present invention may also be used so that a bag may have two or more closure structures.

The channel strip 60 may optionally be colored in order to more easily locate their position on the bag. In another embodiment, the adhesive and/or the roughened surface may also be colored with different colors initially which change into a third color upon closing to provide for closure indication. For example, the adhesive may be yellow and the roughened surface may be blue to make green upon attaching the two closure members together; or other color combinations to make a third color can be used.

In another embodiment useful for closure indication, the closure members may be uncolored initially and upon closing form a color to provide closure indication. For example, when the closure members are made from polarized film such that when the closure members are superimposed upon each other, the closed or contacted closure changes to a certain color such as from clear to dark.

Figure 21:
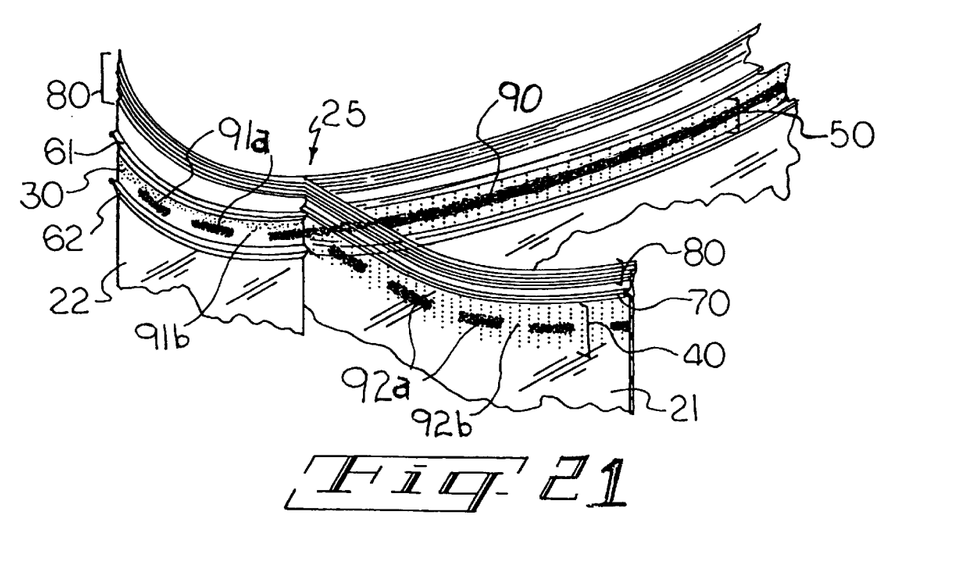
FIG. 21 is another embodiment of the closure of the present invention showing a portion of the bag, with the closure portion partly opened and partly closed.

In still another embodiments shown in FIG. 21, the closure members may be colored at certain intermittent or interrupted portions 91a, 92a to form a series of uncolored spaces 91a, 92a between colored portions of the closure member to form a "dashed" line along the closure strip. The dashed lines are offset such that when the two dashed lines are contacted, the uncolored spaces and colored portions of the closure members interdigitate and mesh together to form a single solid line 90 of a particular color to provide an indication to the user that the bag is closed.

In carrying out the process of manufacturing the thermoplastic bags containing the closure of the present invention, a film web is formed, for example, by an extrusion process, and then the adhesive strip 30 may be applied to the film web during the extrusion step or in a separate step. Various conventional methods can be used to affix the adhesive on the film web including, for example, the process described in U.S. Pat. No. 4,392,897, incorporated herein by reference. Also, substantially simultaneous or in a separate step, the roughened surface 40 and the roughened surface 50, respectively, are formed on the film web. Preferably, the film web is embossed on one side of the film web with enough force to substantially simultaneously form the roughened surface 40 and the roughened surface 50. After the web has been embossed, the web is folded and heat sealed by techniques well known in the art to form the final bag structure.

Although specific embodiments of the present invention have been described it is to be understood that modifications and variations may be found by those skilled in the art which are within the spirit and scope of the invention.

What is claimed is:

1. A closure on a reclosable thermoplastic bag comprising:
   a first closure element consisting of an adhesive strip positioned transversely across a first inner surface of a first sidewall of a bag;
   a second closure element comprising an inner roughened surface strip positioned transversely across a second inner surface of a second sidewall of a bag, the inner roughened surface being an integral portion of the second sidewall, the inner roughened surface being pressable against and into the adhesive strip to form a closure.

2. The closure of claim 1, wherein the adhesive strip is a pressure-sensitive adhesive strip.

3. The closure of claim 1, further comprising an outer roughened surface strip affixed to the outer surface of the second sidewall opposite the inner roughened surface strip, the outer roughened surface providing a tactile surface.

4. The closure of claim 3 where in the outer roughened surface is an embossed surface.

5. The closure of claim 1 wherein the inner roughened surface comprises a plurality of uniformly-shaped protuberances evenly distributed throughout the roughened surface.

6. The closure of claim 1 wherein the inner roughened surface is am embossed surface.

7. The closure of claim 1 wherein the adhesive strip is colored.

8. The closure of claim 1 wherein the inner roughened surface is colored.

9. The closure of claim 1 wherein the inner roughened surface contains an adhesive layer coated thereon.

10. In a reclosable thermoplastic bag having two sidewalls, each sidewall having a top edge, two opposing side edges and a bottom edge, the two sidewalls being attached together along the respective side edges and bottom edges, the sidewalls forming a mouth of the bag adjacent to the top edges of the sidewalls, each sidewalls having an inner surface and an outer surface, the inner surfaces of the two sidewalls facing each other, an improved closure comprising:
    first and second cooperating closure elements;
    the first closure element consisting of an adhesive strip positioned across the inner surface of one sidewall proximate to the top edge thereof;
    the second closure element comprising an inner roughened surface across the inner surface of the other sidewall proximate to the top edge thereof, and aligned opposite from the adhesive strip;
    the inner roughened surface being pressable against and into the adhesive strip to form the closure.

11. The bag of claim 10 wherein the adhesive strip is a pressure-sensitive adhesive strip.

12. The bag of claim 10 wherein the inner roughened surface comprises a plurality of uniformly-shaped protuberances evenly distributed throughout the inner roughened surface.

13. The bag of claim 12 including an outer roughened surface strip affixed to the outer surface of the other sidewalls opposite the inner roughened surface to provide a tactile surface.

14. The bag of claim 10 wherein the adhesive strip, the inner roughened surface or a combination thereof are colored.

15. A reclosable thermoplastic bag comprising:
    first and second sidewalls being attached along opposing side edges and bottom edges thereof, the sidewalls forming a mouth of the bag adjacent to top edges of the sidewalls, each sidewall having an inner surface, the inner surfaces facing each other;
    first and second cooperating closure elements disposed along the mouth of the bag;
    the first closure element consisting of an adhesive strip positioned transversely across the inner surface of the first sidewall proximate to the top edge thereof;
    the second closure element comprising an inner roughened surface strip positioned transversely across the width of the inner surface of the second sidewall and aligned opposite from the adhesive strip, the roughened surface strip being an integral portion of the second sidewall and comprising a plurality of uniformly-shaped protuberances evenly distributed throughout the inner roughened surface strip;
    such that the inner roughened surface strip is pressable against and into the adhesive strip to form the closure.

* * * * *